(12) United States Patent
Johnson

(10) Patent No.: US 7,938,236 B2
(45) Date of Patent: May 10, 2011

(54) COMPOSITE ARTICLE

(75) Inventor: David Callum Johnson, Warwickshire (GB)

(73) Assignee: Meggitt Aerospace Limited (GB)

( * ) Notice: Subject to any disclaimer, the term of this patent is extended or adjusted under 35 U.S.C. 154(b) by 0 days.

(21) Appl. No.: 10/671,358

(22) Filed: Sep. 25, 2003

(65) Prior Publication Data

US 2005/0011706 A1 Jan. 20, 2005

(30) Foreign Application Priority Data

Jul. 15, 2003 (GB) .................................. 0316530.5

(51) Int. Cl.
*F16D 65/12* (2006.01)
(52) U.S. Cl. .......... 188/218 XL; 188/251 M; 188/251 R
(58) Field of Classification Search ............ 188/251 AU, 188/73.2, 218 XL, 73.1; 192/107 M, 70.14; 428/212, 218, 698, 408
See application file for complete search history.

(56) References Cited

U.S. PATENT DOCUMENTS

| | | | |
|---|---|---|---|
| 3,712,427 A | 1/1973 | Cook et al. | |
| 3,800,392 A | 4/1974 | Cook et al. | |
| 3,897,582 A * | 7/1975 | Olcott | 188/251 R |
| 3,956,548 A | 5/1976 | Kovac et al. | |
| 4,029,829 A | 6/1977 | Weaver et al. | |
| 4,875,766 A | 10/1989 | Shimodaira et al. | |
| 4,982,818 A | 1/1991 | Pigford | |
| 5,242,746 A * | 9/1993 | Bommier et al. | 442/247 |
| 5,547,717 A * | 8/1996 | Scaringella et al. | 427/590 |
| 5,558,186 A | 9/1996 | Hyde et al. | |
| 5,750,058 A * | 5/1998 | Hecht et al. | 264/29.6 |
| 5,779,006 A | 7/1998 | Hyde et al. | |
| 5,878,849 A * | 3/1999 | Prunier et al. | 188/251 A |
| 5,900,297 A * | 5/1999 | Rudolph et al. | 428/66.2 |
| 6,042,935 A | 3/2000 | Krenkel et al. | |
| 6,057,022 A | 5/2000 | Purdy et al. | |
| 6,079,525 A * | 6/2000 | Dietrich et al. | 188/251 A |
| 6,174,594 B1 | 1/2001 | Smith et al. | |
| 6,221,475 B1 | 4/2001 | Domergue et al. | |
| 6,323,160 B1 * | 11/2001 | Murdie et al. | 508/109 |
| 6,514,562 B1 * | 2/2003 | Clark et al. | 427/140 |
| 6,514,592 B1 * | 2/2003 | Hubbard et al. | 428/66.2 |
| 6,551,709 B1 * | 4/2003 | Stover | 428/408 |
| 2002/0068164 A1 | 6/2002 | Martin | |
| 2002/0176990 A1 * | 11/2002 | Johnson | 428/408 |

(Continued)

FOREIGN PATENT DOCUMENTS

DE    198 37 768 A1    3/2000

(Continued)

OTHER PUBLICATIONS

Patents Act 1977: Search Report under Section 17 re Appl. No. GB 0316530.5 dated Jan. 13, 2004.

(Continued)

*Primary Examiner* — Melanie Torres Williams
(74) *Attorney, Agent, or Firm* — Renner, Kenner, Greive, Bobak, Taylor & Weber

(57) ABSTRACT

A composite article for use in an aircraft brake heat pack, the article comprises a core layer having a face portion and a wear layer attached to the face portion, wherein the wear layer has a density lower than the core layer. The core layer is preferably formed from impregnated C—C and the wear layer is preferably formed from C—C. The article may be used as a brake disc.

8 Claims, 2 Drawing Sheets

U.S. PATENT DOCUMENTS

2002/0179382 A1  12/2002  Fryska et al.
2003/0057040 A1  3/2003  Bauer et al.
2004/0058154 A1* 3/2004  Lau et al. ................ 428/408

FOREIGN PATENT DOCUMENTS

| EP | 1260729 A1 | 11/2002 |
| GB | 2012671 | 8/1979 |
| GB | 2 298 687 A | 9/1996 |
| GB | 2356642 | 5/2001 |
| GB | 2356642 A | 5/2001 |
| GB | 2403989 * | 1/2005 |
| WO | WO 2005/008097 A2 * | 1/2005 |

OTHER PUBLICATIONS

Standard Search Report dated Mar. 2, 2004.
Disclosure at http://www.graphite-eng.com/materials.html.
Disclosure at http://www/ukdata.com/creditreports/viewCompanyDetails.do?companyID=01496514&full.
Disclosure at http://www.graftech.com/getattachment/bec97181-4360-45dc-80e6-7d671ca5621e/Grade-ATJ-Isomolded-Graphite.aspx.

* cited by examiner

COMPOSITE ARTICLE

RELATED APPLICATIONS

This application claims priority of British Application No. GB 0316530.5, filed Jul. 15, 2003.

This invention relates to a composite article which exhibits low wear and which has a high heat capacity. Particularly, but not exclusively, the invention relates to a carbon friction disc for use in, say, an aircraft brake.

For reasons of economic expediency, today's aircraft programmes are increasingly driven by the need to reduce weight. Such weight reductions allow for an increase in the payload to be carried and/or a reduction in the fuel required to fly the aircraft, both important considerations in times of decreasing or squeezed profit margins and greater environmental awareness.

Carbon-carbon composite (C—C) brake discs have become established as the material of choice for aircraft multi-disc brake systems where their relatively high cost is justified by their relatively lower weight compared with the metallic alternative. The high specific heat of carbon allows large quantities of energy to be absorbed by a low brake heat-pack mass during braking.

Early developments in C—C brake discs found that some materials with low wear properties lacked the structural strength needed for the transfer of torque in the brake. A solution to this problem is proposed in U.S. Pat. No. 3,712,427 and U.S. Pat. No. 3,956,548 where low-wear C—C faces were attached by mechanical means or bonding to a high strength core material.

The high cost of C—C following its introduction as an aircraft brake friction material produced a desire for discs to be suitable for refurbishment and reuse without the need for complete replacement. U.S. Pat. No. 3,800,392 and U.S. Pat. No. 5,558,186 propose systems where wear faces could be removed from a carrier disc at the end of their service life and replaced with virgin material. U.S. Pat. No. 4,982,818 discloses a system wherein the core of a worn disc is split into two and each half is adhered to a virgin core to provide a new friction disc.

The minimum brake heat-pack mass, that is the reject mass at which the brake heat-pack must be removed (brake reject mass) is frequently determined by the energy to be absorbed during the most demanding braking event, the Reject-Take-Off (RTO). The required mass of a new heat-pack is determined by calculating the required reject mass plus an allowance for wearable material that is a function of wear rate per stop and number of stops the brake is required to perform during its service life.

Although a C—C brake heat-pack offers significant weight reduction compared with the metallic alternative, the relatively low density of C—C (typically in the region of 1.6-1.85 gcm$^{-3}$) means the C—C brake heat-pack occupies a large volume that must be supported and accommodated in the surrounding brake chassis and wheel structures.

In the past, C—C brake discs have been infiltrated with molten silicon and heat treated to react at least some of the silicon with the carbon of the matrix to form silicon carbide which improves the friction properties of the so-formed disc. Such materials are known to have a higher density than the C—C of the 'base' disc, the density of the siliconized material being typically in the range 1.9-2.2 gcm$^{-3}$. However, the wear rate of such siliconized brake discs is typically significantly higher than that of a corresponding C—C disc, thus requiring a longer heat-pack of higher density and thereby increasing overall weight of the wheel and brake.

It is an object of this invention to provide a composite article which exhibits an improved capacity for energy absorption and/or a low wear rate in use when in frictional engagement with another composite article of the invention or other article.

It is a particular but not exclusive objective of the invention to provide a composite article which is suitable for use as a friction disc in an aircraft brake, the disc having one or both of an improved capacity for energy absorption and a low wear rate to minimise the weight of a heat-pack and/or to reduce the length of a so-formed heat-pack. It is postulated that by reducing the length of the heat-pack the length of a surrounding brake chassis and other wheel components will be reduced, concomitantly reducing the weight of the aircraft.

In a first aspect the invention provides a composite article, for example a brake disc for an aircraft brake heat pack, the, say, disc comprising a core layer having a face portion and a wear layer attached to the face portion, wherein the wear layer has a density lower than the core layer.

A second aspect of the invention provides a composite article, for example a brake disc for an aircraft brake heat pack, the composite article comprising a core layer formed from C—C composite impregnated with a refractory carbide, the core layer having a face portion to which is attached a C—C wear layer.

There is further provided a method of forming a composite article, for example a brake disc for an aircraft brake heat pack, the method comprising forming a core layer from a relatively higher-density material, the core layer having a face portion, and forming a wear layer from a relatively lower-density material and attaching the wear layer to the face portion of the core layer.

A fourth aspect of the invention provides a method of forming a composite article, for example a brake disc for an aircraft brake heat pack, the method comprising forming a C—C core layer with a face portion, densifying the core layer by liquid impregnation; forming a C—C wear layer and attaching the wear layer to the face portion of the core layer.

Preferably, the wear layer has a density of from 1.55 to 1.85 gcm$^{-3}$. Preferably the core layer has a density in the range 1.85-2.95 gcm$^{-3}$, most preferably in the range of from 2.0 to 2.3 gcm$^{-3}$.

The core layer can be densified by impregnation with silicon and/or boron, preferably liquid silicon and/or boron which, in a most preferred embodiment, forms refractory silicon and/or boron carbide through reaction with a carbon matrix comprising at least part of the core layer.

The wear layer may be formed from low wearing C—C such as that disclosed in British patent GB 2,356,642B (held in the name of the current applicant) in which the wear layer is formed from carbon fibres which extend radially from the inner periphery of the wear layer toward or to its outer periphery.

A further aspect of the invention provides an aircraft wheel and brake assembly comprising brake discs, one or more of the brake discs having a core layer of density greater than 1.85 gcm$^{-3}$ and at least one wear layer attached to the core of density 1.85 gcm$^{-3}$ or lower.

Preferably, the wear layer is formed of low wearing C—C.

In order that the invention may be more fully understood, it will now be described by way of example only and with reference to the accompanying drawings, in which.

Figure 1:
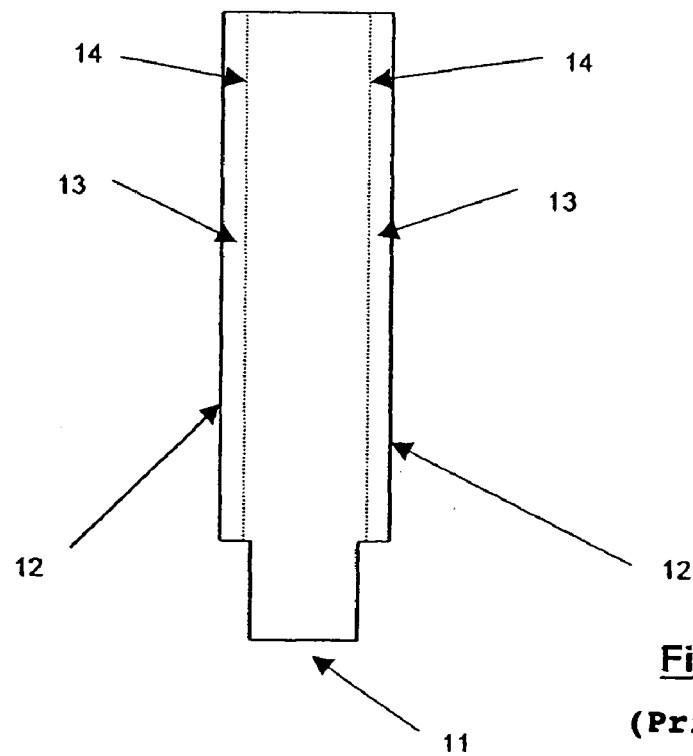
FIG. 1 is an illustration of a cross section through a prior art C—C brake disc showing regions of wearable carbon.

Referring to FIG. 1, a sectional view of a prior art brake disc for an aircraft multi-disc brake is shown. Here, a C—C rotor brake disc 11 is shown with drive keys (not shown) on the outer periphery thereof for engagement into an aircraft wheel (not shown). The brake disc 11 has two wear surfaces 12, one on each major face of the disc 11 for frictional engagement with discs located either side thereof when installed in a brake assembly. As the disc 11 wears during use, the wear surfaces 12 will progress through the thickness of the underlying material 13 until position 14 is reached, at which point the disc 11 is fully worn and will be replaced.

A brake assembly known in the art typically has C—C rotor discs keyed to and rotating with the wheel and interleaved between C—C stator discs keyed to a torque tube which is mounted to the landing gear leg axially around the axle. The assembly of stator and rotor discs is known as a "heat pack". The friction faces of the discs become frictionally engaged when the brake pressure load is applied by the actuator pistons in the brake piston housing. The actuator pistons can be actuated hydraulically or electrically by brake control systems. As the brake friction discs wear at the frictionally engaging surfaces the thickness of the heat pack is reduced, the reduction in thickness normally being shown by a wear indicator mechanism. When the heat pack reaches its fully worn thickness the heat pack is removed and replaced with new discs. The length of the heat pack at this fully worn condition is known as the reject heat pack length.

Figure 2:
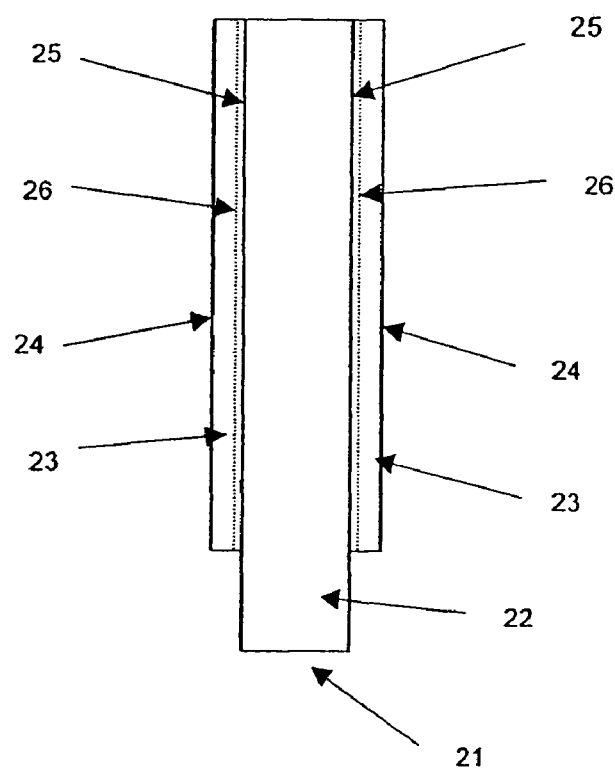
FIG. 2 is an illustration of a cross section through a disc of the invention showing the C—C wear faces bonded to a core.

FIG. 2 is a sectional view through a brake disc 21 of the invention. The density of the core material 22 is higher than 1.85 gcm$^{-3}$ (i.e. the density normally known in the art for C—C aircraft brake discs). This is achieved by forming a compressed core of C—C or by forming a usual C—C core and impregnating the same with molten silicon and/or boron. Subsequent to or during impregnation, the elemental silicon and/or boron reacts with the carbon matrix material to form silicon and/or boron carbide. Molten silicon is infiltrated into the C—C core at a temperature of about 1420° C. in an inert atmosphere after degassing of the C—C core under a vacuum of 10$^{-1}$ mbar. The Si that is impregnated into the C—C can then be transformed, in whole or in part, to Silicon Carbide (SiC) by reaction with the carbon matrix material in the C—C by heating to temperatures of about 1800° C. Such a core material will typically have a density in the range of 2.0-2.3 gcm$^{-3}$ depending on the properties of the initial C—C. If the start C—C has a density of 1.65 gcm$^{-3}$ and an open porosity of 20% the density after siliconising will be typically be a minimum of 2.1 gcm$^{-3}$ with 95% conversion of Si to SiC.

The wear faces 23, which have a wear surface 24 for frictional engagement, are attached to the core 22 by bonding means at an interface 25 therebetween. The wear faces 23 may be bonded to the core 22 by mechanical means, such as rivets and the like, by chemical bonding agents such as a high temperature brazing alloy, for example Nicrobraz 30 supplied by Wall Colmonoy, by diffusion bonding involving bringing the C—C wear face into intimate contact with the high density C—C core or Si and/or Boron rich core, preferably with pressure applied to maintain the intimate contact, and heating to elevated temperatures in excess of 1300° C. to cause bonding between the C—C wear face and core without contaminating the wear face with Si and/or boron. Bonding can be brought about by the application of a layer of a carbide forming element such as Si or boron at the interface of the core and wear face, the core and wear face then being held in intimate contact during heating in a controlled atmosphere and/or vacuum to a temperature sufficient for the carbide forming element to melt and react with the surface of the wear face and core to form a carbide layer. The temperature for this process is in excess of 1400° C. where Si is used and in excess of 2200° C. where boron is used. Alternatively, the wear faces 23 and core 22 may be brought into intimate contact and bonded together by infiltrating with a decomposable carbon-containing gas and subsequent carbonization thereof. The decomposable carbon-containing gas could be a hydrocarbon gas such as methane, propane, butane or the like and could be infiltrated into the interface between the core and wear face under vacuum and/or inert atmosphere conditions, the hydrocarbon gas being cracked to deposit carbon at the interface under temperature and atmosphere conditions known in the art, typically being in the order of 1 mbar vacuum at 1000° C. Such a bonding process has been found to be more effective where a layer of carbon felt is inserted at the interface between the wear face and core.

The wear faces 23 have a thickness of wearable material available, the limit of which is shown at position 26. Brake discs 21 are shown with two wear faces 23, however, it will be appreciated that some brake discs might only have one wear face, in particular those stators at the ends of the heat pack. Wear faces 23 could be of C—C material (of, say, density of 1.6 to 1.85 gcm$^{-3}$) or other material having suitable wear rate and friction properties for application as an aircraft brake disc.

Figure 3:
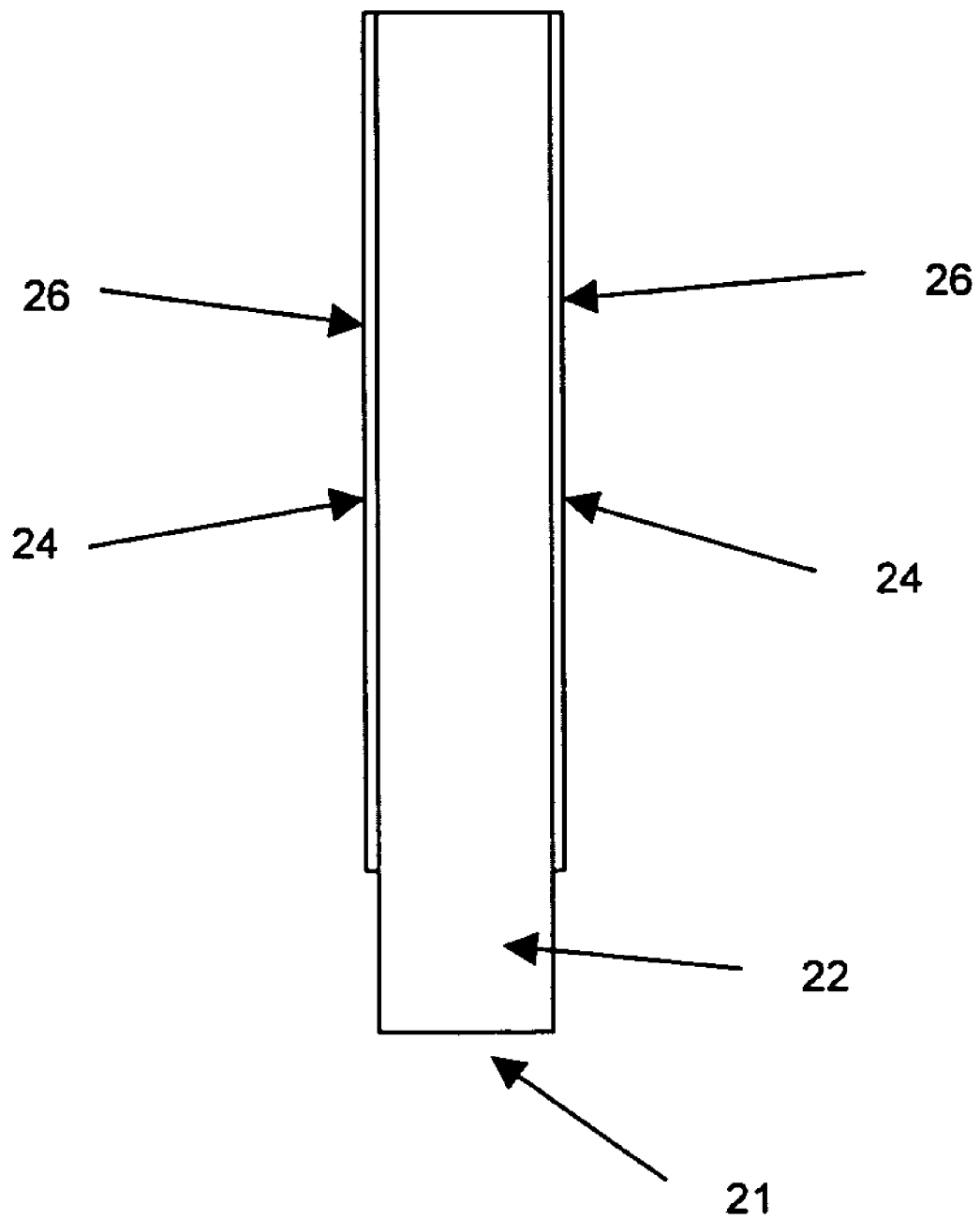
FIG. 3 is an illustration of a cross section through a disc of the invention showing the C—C wear faces worn to reject thickness.

FIG. 3 is a sectional view through a brake disc 21 of the invention as shown in FIG. 2 with the wear surfaces 24 worn to the wear limit at position 26.

To show the benefit derived from the brake discs of the invention, reference is made to the following Examples. In each case, the data refer to an aircraft brake with a brake heat pack comprising 9 discs (4 rotors and 5 stators) designed to fit in a 19" (482.6 mm) wheel, required to absorb an energy of 46.67×10$^6$ ft.lbs (63284.520 kJ) during rejected take off (RTO).

EXAMPLE 1

Brake in C—C

Prior Art

| | |
|---|---|
| Wear rate of C—C wear faces per landing | 0.00008" (2 μm) |
| Number of landings required during service life | 1500 |
| Density of C—C | 1.85 gcm$^{-3}$ |
| New heat pack length | 11.314" (287.376 mm) |
| Reject heat pack length | 9.394" (238.608 mm) |
| Heat pack weight | 105.8 lb (47.99 kg) |

EXAMPLE 2

Brake of the Invention

| | |
|---|---|
| Wear rate of C—C wear faces | 0.00008" (2 μm) |
| Number of landings required during service life | 1500 |
| Core material density | 2.10 gcm$^{-3}$ |
| Wear face density | 1.85 gcm$^{-3}$ |
| New heat pack length | 10.852" (275.641 mm) |
| Reject heat pack length | 8.972" (227.889 mm) |
| Heat pack weight | 105.8 lbs (47.99 kg) |

Reduction in heat pack length of 0.422" (10.719 mm) is achieved compared with the prior art brake in C—C material to meet the same brake performance specification. This 0.422" (10.719 mm) reduction in heat pack length will allow weight savings in the wheel and brake assembly through a shorter brake torque tube and changes to the wheel design that can be facilitated by the shorter brake length.

The benefits can be improved further using lower wearing wear faces that may not be suitable as brake disc material because they might not meet strength requirements for transfer of torque during braking

EXAMPLE 3

Brake of the Invention

| | |
|---|---|
| Wear rate of C—C (low wear rate) per landing | 0.00004" (1 μm) |
| Number of landings required during service life | 1500 |
| Core material density | 2.10 gcm$^{-3}$ |
| Wear face density | 1.85 gcm$^{-3}$ |
| New heat pack length | 9.605" (243.967 mm) |
| Reject heat pack length | 8.972" (227.889 mm) |
| New Heat pack weight | 97.46 lbs (44.21 kg) |

Reduction in heat pack length of 1.709" (43.409 mm) is provided compared with the (Example 1) prior art brake in C—C material to meet the same brake performance specification. Reduction in heat pack length is more than that provided by Example 2, resulting in further weight savings in the wheel and brake assemblies.

The discs of the brake heat pack in Example 1 were manufactured using non-woven reinforcement of the type described in GB 2,012,671 comprising continuous fibres and a layer of staple fibres needled to the continuous fibres. Segments with continuous fibres in the radial and tangential directions were cut from the fabric and laid up in a spiral fashion around a central bung. A segment angle of 48° was used to avoid alignment of segment joints across adjacent layers and segments were alternated between radial fibre direction and tangential fibre direction. The lay-up was continued until sufficient segments had been added to achieve a 20% fibre volume when the central bung was removed and the assembly of segments was compressed to a predetermined volume in a suitable fixture. The assembly was then infiltrated with carbon, by CVI under conditions known in the art, to a density of approximately 1.3 gcm$^{-3}$, taken from the compression fixture and further infiltrated to the density required for a disc density of 1.85 gcm$^{-3}$ after heat treatment and machining. The infiltrated discs were then graphitized by heat treating to 2400° C. in an inert atmosphere and then machined to final dimensions.

The manufacturing method described above for the C—C brake discs of Example 1 was also used for the C—C wear faces of Example 2. The C—C wear faces of Example 3 differed in that only segments of the radial fibre direction were used in accordance with the brake discs of the invention in GB 2,356,642B.

The core material in Example 2 and Example 3 was manufactured from C—C having non-woven reinforcement of the type described in GB 2,012,671B comprising continuous fibres and a layer of staple fibres needled to the continuous fibres. The fabric is cut into segments or annuli, laid up to the required thickness and weight and compressed into a jig or needled into a preform to a fibre volume of approximately 20%. The assembly of fibres in the jig or the preform is then infiltrated with carbon in one or more cycles in a chemical vapour infiltration (CVI) process known in the art until a density of 1.60-1.65 gcm$^{-3}$ was attained. This carbon was then impregnated with Si which was converted to SiC by reaction with the carbon matrix under conditions known in the art. The resulting siliconized C—C core had less than 5% unconverted Si and a density of 2.15 gcm$^3$.

Wear faces were bonded to the cores in Examples 2 and 3 by the use of the braze filler alloy Nicrobraz 30 and by the use of carbon felt infiltrated by CVI.

Wear faces bonded to cores with Nicrobraz 30 braze filler alloy had a layer of braze filler alloy applied between the wear faces and core. The discs were held in intimate contact by the application of a pressure of 10 psi during heating under a vacuum of 10$^{-4}$ mbar to a temperature of 1180° C.

Wear faces bonded to cores with a carbon felt infiltrated by CVI had a layer of carbon felt inserted at each of the wear face to core interfaces. The wear face, felt and core surface were held in intimate contact by clamping discs in a fixture before being processed in a CVI furnace under conditions known in the art for the deposition on carbon from a gas comprised mainly of methane. It can assist bonding by this method if the carbon felt is impregnated with a carbonisable resin that can be heat treated to leave a carbon deposit.

Wear face thickness in Example 2 is 0.240" (10 mm) and 0.120" (5 mm) in Example 3. The wear face thickness allows for the required number of landings at the known wear rate allowing a factor of 2 for uneven wear.

A measure of the savings involved can be shown as the ratio of length of heat pack to overall heat pack weight, viz;

| | Length (L)/ mm | Weight (W)/kg | L/W mmkg$^{-1}$ |
|---|---|---|---|
| Example 1 | 287.376 | 47.99 | 5.99 |
| Example 2 | 275.641 | 47.99 | 5.74 |
| Example 3 | 243.967 | 44.21 | 5.52 |

Thus, it can be seen that brake heat packs of the invention (Example 2 and 3) provide a respective 4% and 8% reduction over the brake heat pack of the prior art (i.e. the ratios of L/W for the respective heat packs).

It will be thus appreciated by the skilled addressee that by using brake heat packs comprising the brake discs of the invention many advantages can be delivered. For example, the length of the new heat pack can be reduced leading to concomitant reductions in wheel and brake weight. Moreover, the use of a bond layer with low thermal conductivity opens the possibility of operating the wear surfaces at a temperature that reduces wear and/or improves friction performance, particularly during aircraft taxi-out when wear in C—C brake discs has been found to be disproportionately high for the brake energy involved.

Wear faces on discs running in frictional engagement during service in a brake heat pack could be manufactured from a common C—C wear face blank, cut down to provide wear faces of the required thickness. This would have benefits during the operation of the brake as friction faces. Wear surfaces with different densities are found to wear at different relative rates, although the overall wear of the brake heat pack is unaffected. In any wear couple with two C—C surfaces the surface with the higher density is found to wear at a higher rate. Some of the benefits of using a high density core are, therefore, lost as the wear face thickness has to include a factor for uneven wear in the heat pack wear faces during service. Balancing the wear face densities by manufacturing from the same blank those faces that will be in frictional engagement would have the advantage of providing even wear across the heat pack during service and reducing any factors built in to the thickness of wear faces to allow for uneven wear.

In addition it will be appreciated that the use of wear faces allows discs to be readily refurbished by the removal of fully worn wear faces and replacement with new faces bonded to the core. Such a refurbishment capability gives considerable economic benefits in the operation of composite brake discs.

It is envisaged that wear faces can be attached to core discs with a flat surface or the wear faces can be attached into a recessed area in the core.

Whilst the invention has been described in relation to aircraft brake discs, it may also be used in, say, clutch discs and other friction discs and the like, where savings of weight are/or size are desirable.

The invention claimed is:

1. An aircraft brake heat pack brake disc in the form of a composite article comprising an annular core layer having an outer perimeter and a face portion and an annular wear layer for frictional engagement with an adjacent brake disc, the annular wear layer attached to and extending across the face portion, wherein the core layer is a C—C composite article impregnated with a refractory carbide and the wear layer is a C—C composite article and has a density lower than the core layer.

2. The aircraft brake heat pack brake disc as claimed in claim 1, wherein the density of the core layer is in excess of 1.85 $gcm^{-3}$.

3. The aircraft brake heat pack brake disc as claimed in claim 1, wherein the refractory carbide is silicon carbide or boron carbide.

4. An aircraft brake heat pack comprising a brake disc in the form of a composite article comprising an annular core layer formed from C—C composite impregnated with a refractory carbide, the core layer having a density of greater than 1.85 $gcm^{-3}$ and having a face portion extending across and attached to an annular carbide-free C—C wear layer having a density of 1.85 $gcm^{-3}$ or lower.

5. The aircraft brake heat pack as claimed in claim 4, wherein the refractory carbide is silicon carbide or boron carbide.

6. The aircraft brake heat pack as claimed in claim 4, wherein the density of the core layer is in the range of greater than 1.85 $gcm^{-3}$ to 2.95 $gcm^{-3}$.

7. An aircraft wheel and brake assembly comprising brake discs, one or more of the brake discs having an annular core layer of density greater than 1.85 $gcm^{-3}$ and at least one annular wear layer for engagement with an adjacent disc, the wear layer extending across and attached to a face of the core having a density 1.85 $gcm^{-3}$ or lower, wherein the core layer comprises a C—C composite impregnated with refractory carbide.

8. An aircraft brake heat pack comprising a brake disc in the form of a composite article comprising an annular core layer having a face portion and having a density of greater than 1.85 $gcm^{-3}$, extending across and attached to the face portion of the core layer is an annular wear layer for frictional engagement with an adjacent disc, the wear layer having a density of 1.85 $gcm^{-3}$ or lower.

* * * * *